United States Patent [19]
Shortland et al.

[11] Patent Number: 5,305,973
[45] Date of Patent: Apr. 26, 1994

[54] TEMPERATURE NORMALIZED STRUCTURE

[75] Inventors: Harry Shortland, Torrance; Martin L. Shanken, Fountain Valley; Peter O. Paxson, Rancho Palos Verdes; C. Dwayne Johnston, Santee; Guillermo Mas, La Palma, all of Calif.

[73] Assignee: Rockwell International Corporation, Seal Beach, Calif.

[21] Appl. No.: 447,347

[22] Filed: Dec. 7, 1989

[51] Int. Cl.$^5$ .................. B64C 1/38; B64D 37/34
[52] U.S. Cl. .................... 244/117 A; 244/119; 244/123
[58] Field of Search ............ 244/117 A, 123, 119, 244/120, 124

[56] References Cited

U.S. PATENT DOCUMENTS

| | | | |
|---|---|---|---|
| 3,015,461 | 1/1962 | Fineblum | 244/117 A |
| 3,369,782 | 2/1968 | Billig et al. | 244/117 A |
| 4,273,304 | 6/1981 | Frosch et al. | 244/117 A |
| 4,776,536 | 10/1988 | Hudson et al. | 244/117 A |
| 4,786,015 | 11/1988 | Niggemann | 244/123 |
| 4,923,146 | 5/1990 | Anthony | 244/117 A |

Primary Examiner—David H. Brown
Attorney, Agent, or Firm—Charles T. Silberberg; Terrell P. Lewis; Harold C. Weston

[57] ABSTRACT

Circulation of temperature controlled fluid through cavities in structure stiffening members of hypersonic aerospace vehicles precludes destructive temperature gradients in such members and preserves stress residuals for functional requirements.

18 Claims, 2 Drawing Sheets

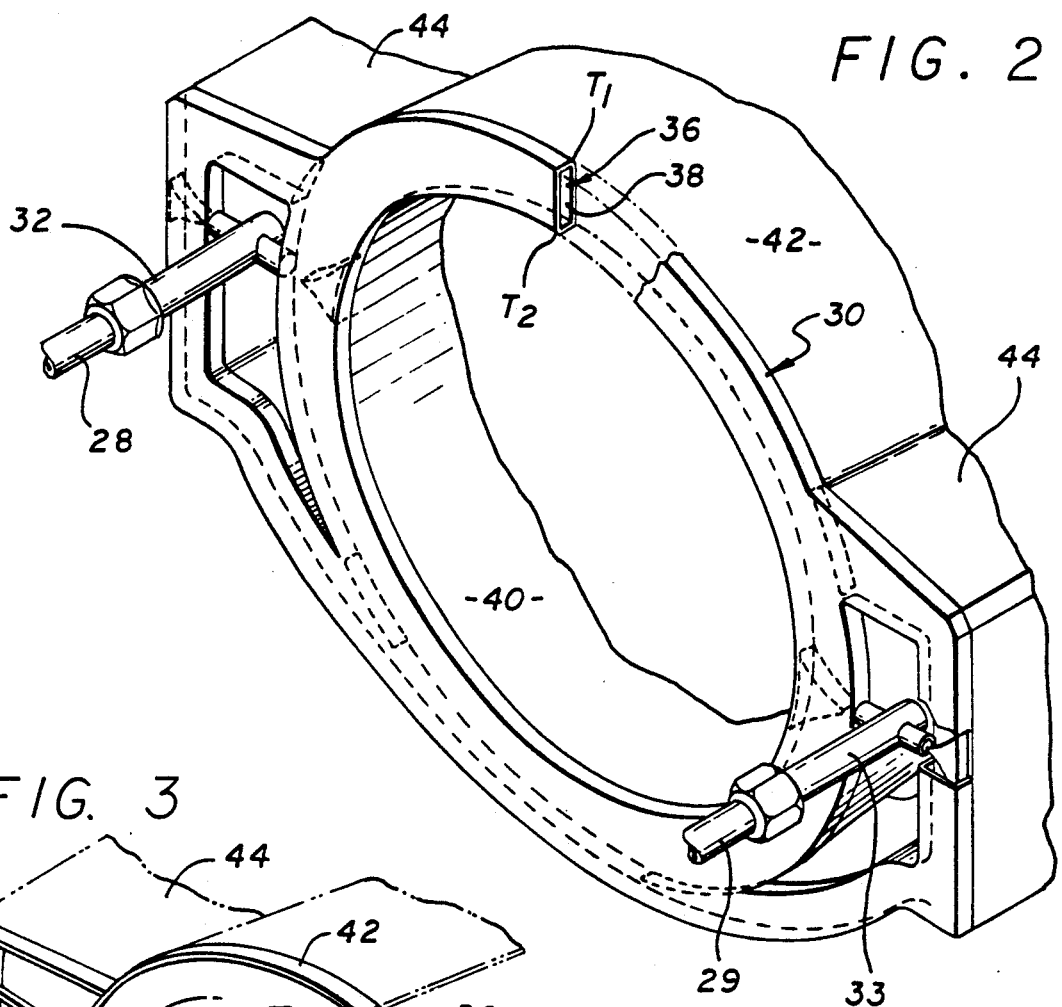
FIG. 2
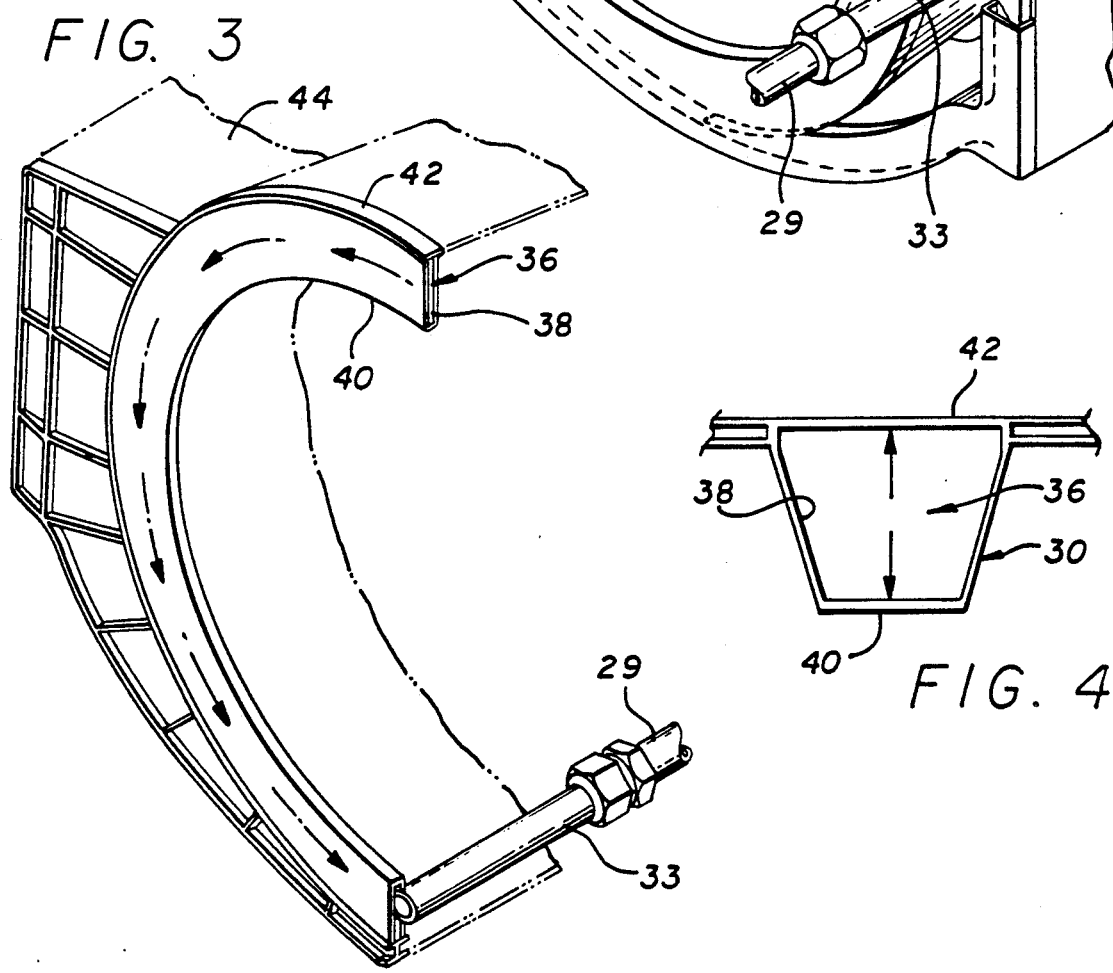
FIG. 3
FIG. 4

TEMPERATURE NORMALIZED STRUCTURE

STATEMENT OF GOVERNMENT INTEREST

This invention was made with Government support under Contract No. F33657-86-C-2127 awarded by the U.S. Air Force. The Government has certain rights in this invention.

BACKGROUND OF THE INVENTION

1. Field of the Invention

This invention relates to hypersonic vehicles and in particular, to a system for minimizing temperature gradients across basic internal structure stiffening members of such vehicles by circulating controlled temperature fluid through central ducts built into the same.

Hypersonic aerospace vehicles such as the Space Shuttle, NASP and the projected Mach 3 to 5 Civilian Transport Aircraft experience rapid and extreme changes in skin temperature as they exit and enter lower earth atmosphere. Correspondingly, temperatures drop to quite low levels during orbital or ecto-atmospheric operations.

Fuselage internal structural elements and external skin panels experience temperature excursions of from −400 degrees to +1600 degrees Fahrenheit with the skin panels sometimes seeing these 2000 degree changes over a 30 minute trajectory.

2. Description of the Prior Art

As a result of more powerful engines, easy accessibility to high specific impulse fuels such as liquid hydrogen and exotic monopropellants and growing needs for single stage to orbit travel, hypersonic vehicles have been designed with a variety of thermal protection systems allowing for speeds of up to Mach 25 without damage to structure by frictional heating from atmospheric gases.

Space Shuttle's tiles and Apollo's ablative nose heat shield are typical of high speed friction adaptive technology. More recent uses of structural cooling means have been disclosed such as those in U.S. Pat. No. 4,786,015 to Niggeman defining a hollow tube conduit system for conductive transfer of heat from structure members to heat exchanger surfaces, and U.S. Pat. No. 4,273,304 by Fosch/Lawning, et al, for a heat removal system using heat pipe means to cool the actual vehicle structure. Neither of these, nor any other found in a search of the literature, provides for the structural element temperature normalizing feature of the within invention. The normalizing system provides heating and cooling, as required, to eliminate thermally induced stresses in individual structural members caused by the extremes of temperature difference between outer skin panels supported by an outer load bearing surface of such members and the internal systems supported by an inner load bearing surface.

Because of temperature gradients across the radial span of the support element, thermal expansion at the extremes of temperature can induce appreciable strain in the member itself, depriving it of strength needed for support and stresses induced by maneuvering or high acceleration profiles of takeoff and descent.

U.S. application Ser. No. 248,687, Integral Structure and Thermal Protection System, assigned to the assignee of the within invention, describes an innovative integrated skin panel/internal structure system for minimizing the effects of high external skin temperature on primary vehicle structure supporting such panels. While each of the above references seeks to protect basic vehicle structure from external or skin conducted high temperatures, none utilizes the temperature normalizing equipments and concepts of this invention wherein a temperature conditioner fluid, not necessarily for cooling only, is used to normalize temperatures across the member to reduce internal stresses caused by thermal differences.

SUMMARY OF THE INVENTION

To relieve thermal stresses across structural stiffening members of a hypersonic aerospace vehicle, this invention incorporates an equipment array of fluid conditioning equipments to circulate temperature controlled fluid through passages built into them. Through proper fluid temperature control and utilizing known heat transfer characteristics between the fluid and stiffening member passages, radial distribution of temperature across the member can be equalized and controlled with significant reduction of internal thermal stresses therein.

Programmed computer means or event actuated system controllers may be used to precondition the structural members to certain temperature conditions prior to planned flight events or to adjust flows and fluid temperatures for other than nominal conditions when sensors on vehicle structures and in fluid lines warrant changes in their temperature.

For normal application of the invention, structural support members of a generally circular or ovate configuration having outer and inner load bearing surfaces are coupled mechanically to vehicle skin panels and internal systems while other provision may be made for connection to longerons of the basic structure. These members are hollow, with a fluid passage running therethrough and having inlet and outlet ports for coupling them to system conduits and conditioning equipment. Size of support elements may vary depending on their position along the fuselage and sizes of the passages therein may also be varied to accommodate needs for flow and temperature response times. Naturally, the higher the mass flow through an element, the greater the potential for equalizing its temperature through control of the mass temperature.

Inner surfaces of such elements are used to support vehicle internal equipments and systems. Distance between the inner and outer load bearing surfaces may be appreciable, and radial temperature gradients can be destructive in systems not controlled by this invention. It is significant that this invention can be used for both heating and cooling of the members, for flight profiles and mission requirements to be satisfied.

Each element is provided an inlet and outlet port for admission and exhaust of conditioning fluid. Several elements in the same general area of vehicle structure may be normalized by a single set of fluid conditioner equipments. Solenoids, and variable orifice valving may also be incorporated into these equipments with computer controls being used in response to fluid temperature sensors distributed through the overall system.

Temperature sensors in the fluid lines or in fluid temperature conditioning equipment, may be coupled to an airborne data processor which can be mechanized to cause changes in flow rate or fluid temperature for a given element or set of elements. Anticipation of demands can also be provided for, such as known re-entry temperature profiles, by preconditioning structural elements prior to the anticipated event. Such advanced conditioning, reserves appreciable fractions of element strength and capacity which would otherwise be expended in unproductive and troublesome differential thermal internal stresses.

Accordingly, it is an object of this invention to provide a means for equalizing temperatures in a basic structure stiffening element of a hypersonic aerospace vehicle to relieve thermally induced stresses that would be present without conditioning.

Concurrent with this objective is that of maximizing availability of structural strength and minimizing weight in such a vehicle by normalizing the temperature of structural elements through forced convective transfer of heat between the element and a temperature controlled fluid.

These objectives can be achieved through incorporation of this invention which is depicted schematically in the following figures, of which:

BRIEF DESCRIPTION OF THE DRAWINGS

FIG. 2 is a partially phantom view of a structure stiffening element showing an internal fluid passageway.

FIG. 3 is a cross-sectional view of a typical fluid passageway with rectangular dimensions.

FIG. 4 is a cross sectional view of a type of fluid passageway with other than rectangular dimensions.

DETAILED DESCRIPTION OF THE PREFERRED EMBODIMENT

Figure 1:
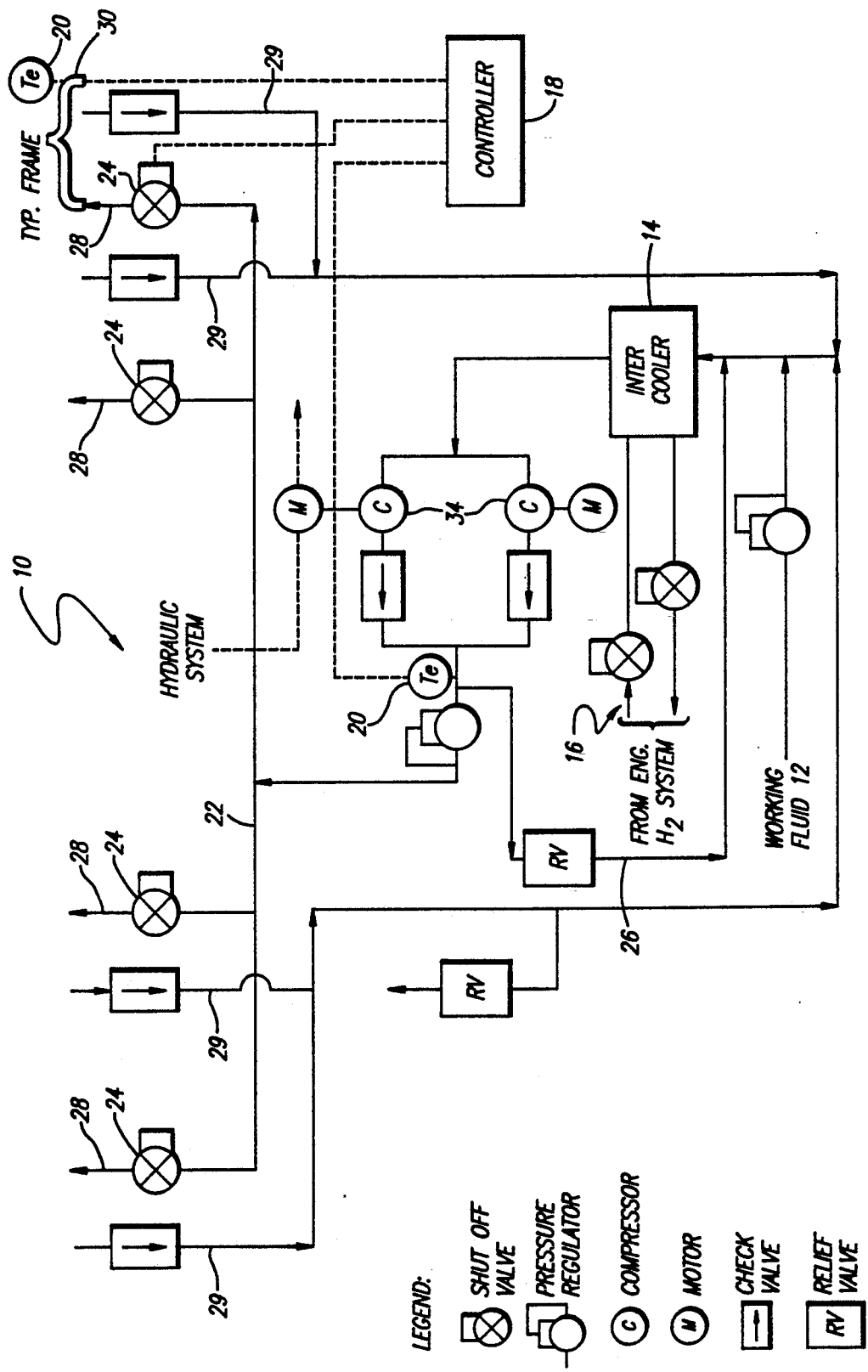
FIG. 1 is a schematic diagram of a typical equipment array used for thermal conditioning of system fluid.

FIG. 1 presents a schematic diagram of the system 10 of this invention. A working fluid 12 having reasonable heat capacity and handling characteristics, such as Nitrogen gas ($N_2$), is introduced to a temperature conditioner set 14 which may include heaters, heat exchangers, filters, radiators compressors, heat sinks and other means to control the temperature thereof. FIG. 1 shows a typical support element for fluid cooling as being cold hydrogen gas from the vehicle's fuel system. Gases such as nitrogen, argon, freon, or a mixture thereof comprise suitable heat exchanger working fluids. Gaseous nitrogen, $N_2$, is a preferred type of working fluid 12. Since a preferred fuel for hypersonic vehicles of this disclosure is slush liquid hydrogen, or SLH, a tap 16 from the fuel system can provide cold Hydrogen gas to be circulated through heat exchangers in conditioner set 14 as chiller for the working fluid used. Heaters may also be provided in set 14 where normalizing of structural element temperatures so requires.

Controller 18 may be controlled by an airborne computer or preprogrammed event timer to vary temperature of the working fuid to accommodate mission requirements. Temperature sensors 20, such as thermocouples, thermistors or resistance thermometers internal to the equipment and throughout the entire normalizing system, may be integrated into a network for analysis by computer means or by a programmable controller 18, to alter temperature of system working fluid 12.

Fluid 12 at a conditioned temperature, is pumped out of conditioning equipment 14 and into a manifold of inlets 22 to structure stiffening elements 30. Flow control valves 24 may be actuated individually or in concert by signals generated in controller means 18. A bypass loop 26 may be used to provide for decreased demand of the manifolded element inlets 22 and unneeded $N_2$ is recirculated through conditioning equipments 14.

Under operational conditions, system controller means 18 will have determined the temperature and flow requirements for reducing gradients $T_1$-$T_2$ across elements 30 as shown in FIG. 2, temperature conditioned $N_2$ from system manifold 22 is routed through ducting 28 to inlet port 32 of support element 30. Compressors or pumps 34, reference FIG. 1, cause the fluid 12 to traverse fluid flow duct 36 of element 30 and impact the inner walls 38 thereof. Heat is transferred convectively between the fluid and the walls and a resultant reduction of radial temperature differences is achieved. Fluid is exhausted from duct 36 at outlet port 33 and is cycled back through ducting 29 to conditioning equipments 14. If temperatures at the inner load bearing surface 40 are lower than those at the outer load bearing surface 42, heat is conveyed into that cooler area from the circulating fluid while high temperatures at the skin panel face result in transfer of heat from the support element there into the working fluid. The heat exchange process precludes extreme temperature differences across the radial portion of element 30 and thermal expansion/contraction stresses are minimized through temperature normalization of the member.

The effect of variation of passage size and flow rates on strength residuals in a typical support element are design considerations to be made for support elements of varied design such as one with dimensions shown in FIG. 3. Other shaped passages (see FIG. 4) will show different strength residuals for comparable flows and dimensions.

We claim:

1. An aerospace vehicle primary structure thermal conditioning system comprising;
a quantity of working fluid;
fluid temperature conditioner equipment;
fluid transfer means including conduit means;
one or more primary structure support elements;
  each such support element having an inner and an outer load bearing surface and a fluid flow duct intermediate said surfaces and generally central thereto,
  each duct having an inlet and an outlet port, said ports being coupled to said conduit means,
temperature sensor means disposed selectively about said conditioning system; and
control means capable of causing said conditioner equipment and transfer means to vary temperature and flow rates of fluid through said support elements.

2. The system of claim 1 wherein said temperature conditioner system includes heat exchanger means.

3. The system of claim 1 wherein said temperature conditioner system includes both heater means and heat exchanger means.

4. The system of claim 1 wherein said temperature conditioner equipment includes fluid cooling means.

5. The system of claim 1 wherein said temperature conditioner equipment includes both fluid heating means and fluid cooling means.

6. The system of claim 1 wherein said fluid transfer means includes pump means.

7. The system of claim 1 wherein said fluid transfer means includes compressor means.

8. The system of claim 1 including control valves regulating flow through said conduit means.

9. The system of claim 1 wherein said fluid flow duct comprises a fluid passage with a rectangular shape.

10. The system of claim 1 wherein said fluid flow duct comprises a fluid passage with other than a rectangular shape.

11. The system of claim 1 wherein said temperature sensor means includes one or more thermocouples.

12. The system of claim 1 wherein said temperature sensor means includes one or more resistance thermometers.

13. The system of claim 1 wherein said control means includes programmable means for controlling said temperature and fluid flow rates.

14. The system of claim 1 wherein said fluid transfer means includes valve means.

15. The system of claim 1 wherein said working fluid is a gas.

16. The system of claim 15 wherein said gas is Nitrogen.

17. The system of claim 1 wherein said outer load bearing surface is adapted for being mechanically coupled to a vehicle skin panel in a heat transfer relationship and said inner load bearing surface is adapted for being mechanically coupled to vehicle internal components in a heat transfer relationship.

18. The system of claim 12 wherein said internal components includes a slush hydrogen fuel tank.

* * * * *